May 31, 1966 J. KIRSCH 3,253,555
CUSHIONED CARGO-SUPPORTING STRUCTURE
Filed March 10, 1965 4 Sheets-Sheet 1
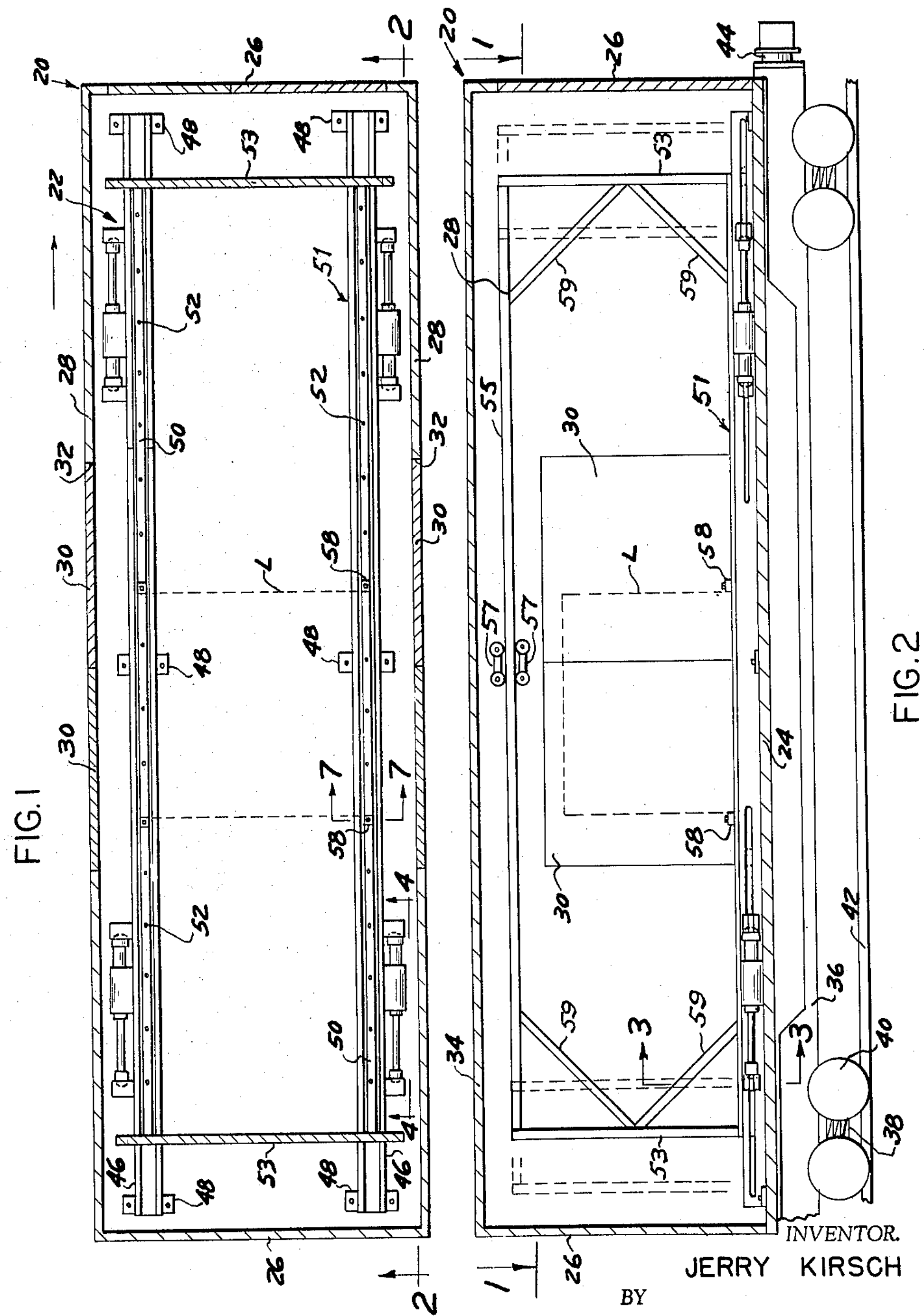
INVENTOR.
JERRY KIRSCH
BY
Barthel & Bugbee
ATTORNEYS CUSHIONED CARGO-SUPPORTING STRUCTURE
Filed March 10, 1965 4 Sheets-Sheet 2
FIG.3
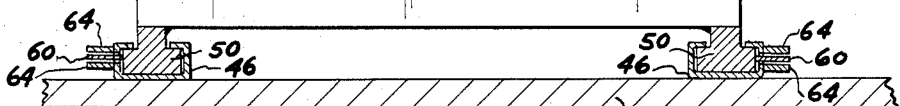
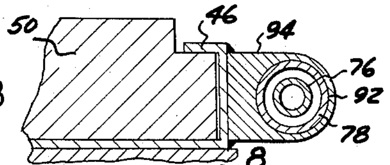
FIG.8
FIG.4
FIG.5
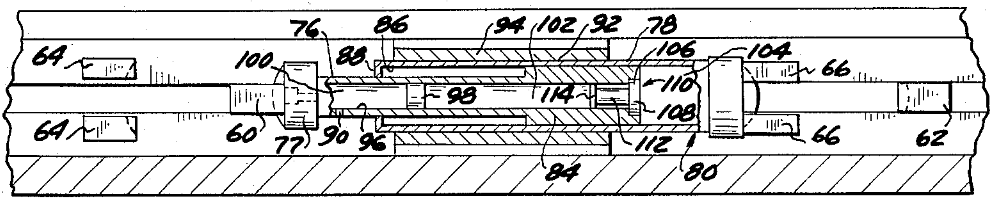
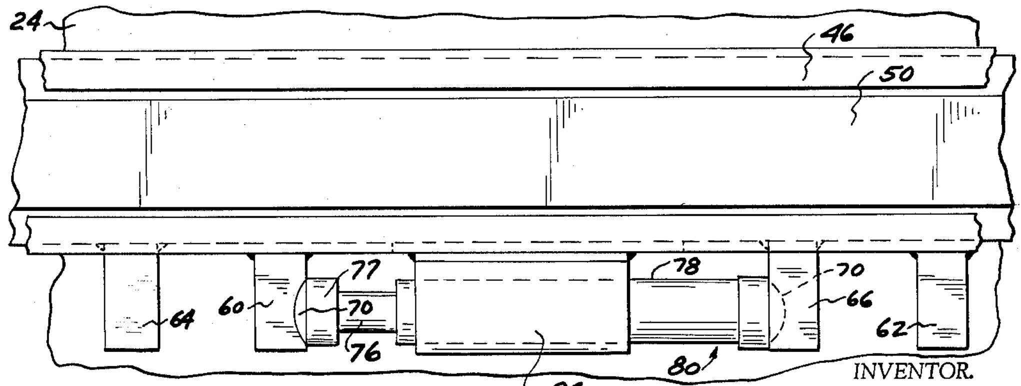
FIG.6
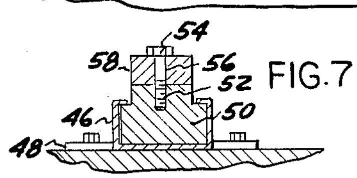
FIG.7
INVENTOR.
JERRY KIRSCH
BY Barthel & Bugbee
ATTORNEYS

CUSHIONED CARGO-SUPPORTING STRUCTURE

Filed March 10, 1965 4 Sheets-Sheet 3

INVENTOR.
JERRY KIRSCH
BY
Barthel & Bugbee
ATTORNEYS

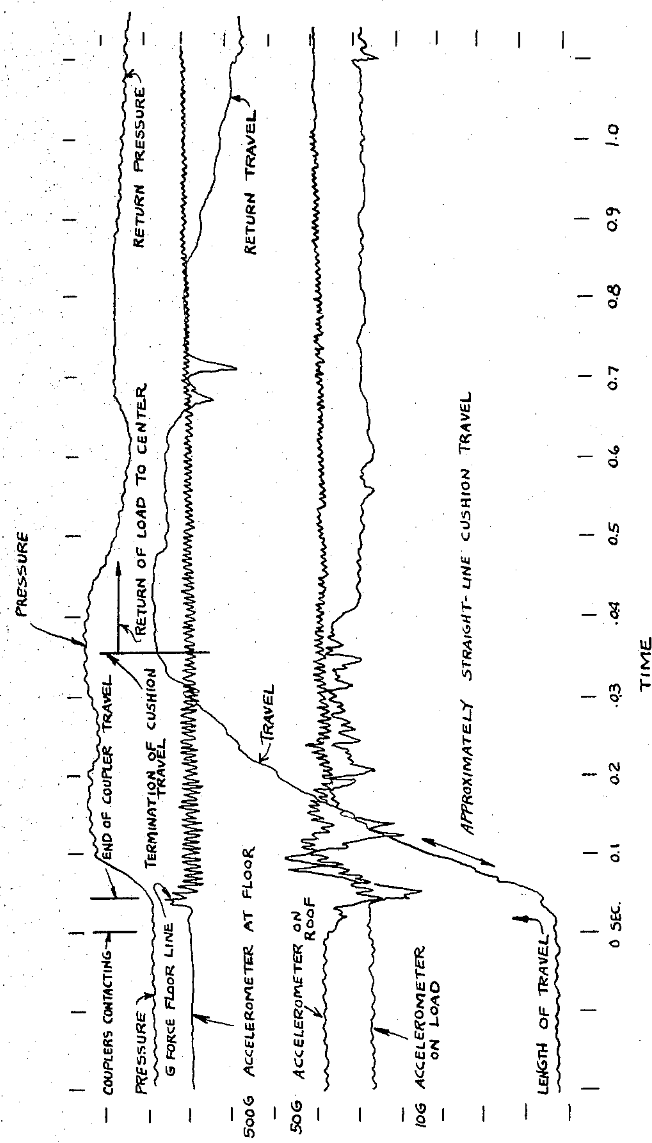
0 —— DISTANCE →
0 —— HYDRAULIC PRESSURE IN CUSHION CYLINDERS →
0 —— ACCELERATION IN G'S →
INVENTOR
JERRY KIRSCH
BY Barthel & Bugbee
ATTORNEYS United States Patent Office 3,253,555

Patented May 31, 1966

3,253,555

CUSHIONED CARGO-SUPPORTING STRUCTURE

Jerry Kirsch, 3946 Bishop Road, Detroit, Mich. 48224

Filed Mar. 10, 1965, Ser. No. 456,016

1 Claim. (Cl. 105—392.5)

This application is a continuation-in-part of my application Serial No. 199,961 filed June 4, 1962 for Cushioned Cargo-Supporting Structure.

This invention relates to cargo carrying vehicles and, in particular to cushioning means for the cargo carried by such vehicles as railroad freight cars, highway trucks, trailers and semitrailers, and freight-carrying aircraft.

Hitherto, cargo being shipped in cargo carrying vehicles, such as the above-named vehicles, has sustained damage occurring as a result of sudden shifting of the cargo from rapid acceleration or deceleration of the vehicle, such as from sudden braking or during switching operations in a freight yard. In my co-pending application Serial No. 140,761 filed September 26, 1961 for Shock-Cushioning Device, now Patent No. 3,167,029 issued January 26, 1965, I have disclosed and claimed an attachment for such vehicles wherein the cargo is carried on racks or hangers and its sudden deceleration or acceleration is cushioned by hydropneumatic devices of my invention, such as those disclosed and claimed in my co-pending application Serial No. 72,476 filed November 29, 1960 for Constant Speed Reciprocable Hydro-Pneumatic Motor, now Patent No. 3,079,897 issued March 5, 1963. The present invention provides a cushioned cargo-supporting structure including a cargo carrier movable along supporting rails and equipped with hydropneumatic cushioning devices to sufficiently reduce the speed and rate of deceleration or acceleration to a point where damage to the cargo from such forces is effectively prevented, as more fully stated in the objects set forth below.

Accordingly, one object of this invention is to provide a cushioned cargo-supporting structure adapted to be installed in an existing cargo vehicle of the above-named character or in new vehicles to which the cargo is secured and which gradually brings the cargo to a halt by reducing an excessively rapid acceleration or deceleration of the vehicle to a sufficiently protracted or retarded acceleration or deceleration which prevents damage to the cargo.

Another object is to provide a modified installation of the cushioned cargo-supporting structure of the foregoing character wherein such rails are attached either to the floor or side walls of the vehicle and wherein the cargo carrier movable therealong is cushioned by the above-mentioned cushioning devices, such as hydropneumatic cushioning cylinders constructed and arranged to effect a sufficiently controlled protracted acceleration or deceleration of the structure relatively to the more rapidly accelerating or decelerating cargo vehicle to prevent damage to the cargo.

Other objects and advantages of the invention will become apparent during the course of the following description of the accompanying drawings, wherein:

FIGURE 1 is a horizontal section through a cargo carrying vehicle, specifically a railway freight car, taken along the line 1—1 in FIGURE 2, and showing in top plan view one embodiment of the cushioned cargo supporting structure according to the invention;

FIGURE 2 is a vertical section taken along the line 2—2 in FIGURE 1, showing in side elevation the cushioned cargo supporting structure according to the invention;

FIGURE 3 is a fragmentary cross section taken along the line 3—3 in FIGURE 2;

FIGURE 4 is an enlarged fragmentary side elevation of one of the cushioning devices, looking in the direction of the line 4—4 in FIGURE 1, with the parts shown in their positions of rest;

FIGURE 5 is a view similar to FIGURE 4, but with the hydropneumatic cushioning cylinder in central vertical section, and with the parts shown in their shifted positions during controlled protracted deceleration or acceleration of the cargo relatively to the vehicle;

FIGURE 6 is a fragmentary top plan view of the cushioning device of FIGURE 5, with the parts in the same relative positions;

FIGURE 7 is an enlarged fragmentary vertical cross section taken along the line 7—7 in FIGURE 1, showing the movable and stationary rails of the cushioned cargo-supporting structure;

FIGURE 8 is a vertical cross section taken along the line 8—8 in FIGURE 4;

Figure 9:
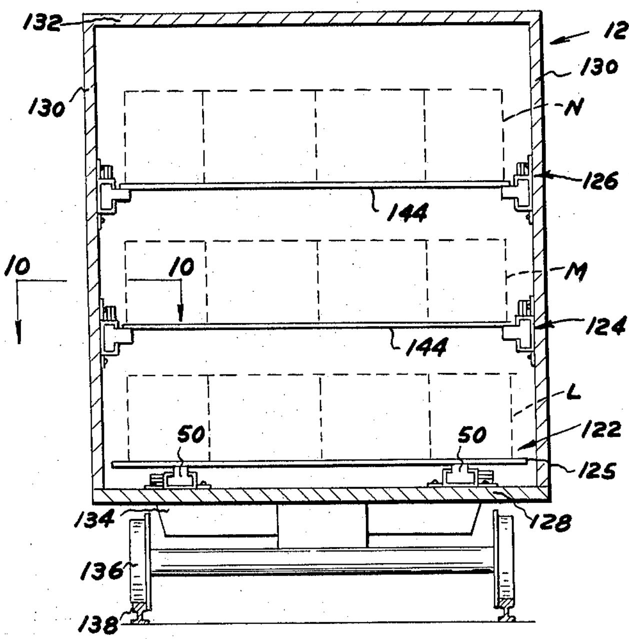
FIGURE 9 is a vertical section through a plane immediately inside one of the end walls of a cargo carrying vehicle, such as a freight car, showing in end elevation a modified installation, according to the invention, including multiple cargo supporting structures, certain of the supporting rails of which are attached to the side walls of the vehicle and others to the floor thereof.
Figure 11:
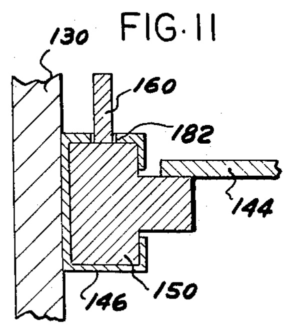
Figure 10:
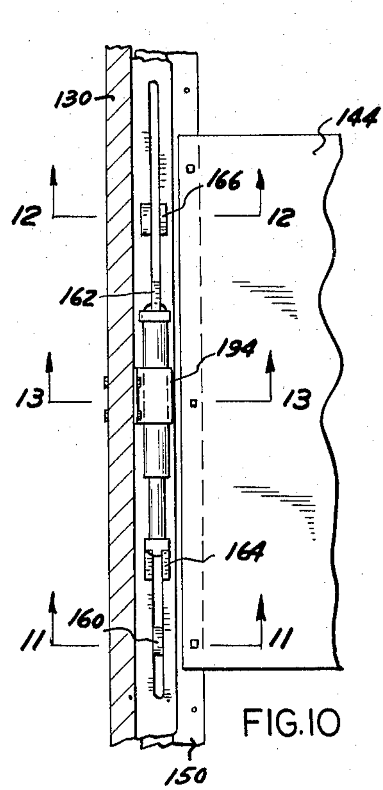
FIGURE 10 is a fragmentary top plan view, taken along the line 10—10 in FIGURE 9, showing the parts in their neutral or resting position.
Figure 12:
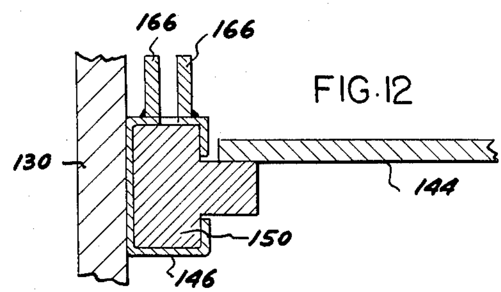
Figure 13:
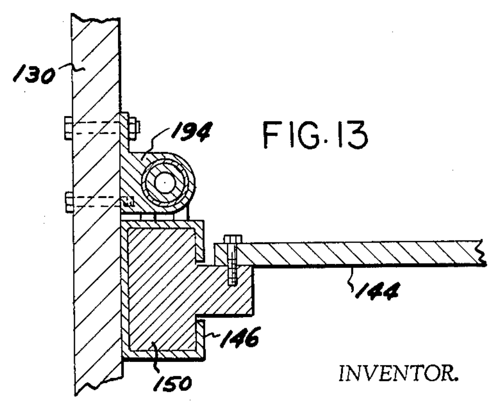

FIGURES 11, 12 and 13 are enlarged fragmentary cross sections taken along the lines 11—11, 12—12 and 13—13 respectively in FIGURE 10; and FIGURE 14 is a chart showing pressure gauge and accelerometer readings during an actual test of the invention at an impact speed of 10.03 m.p.h. with a 14.1 inch cushion travel.

Referring to the drawings in detail, FIGURES 1 to 3 inclusive show a cargo carrying vehicle, generally designated 20, shown diagrammatically as a conventional railroad freight car, equipped with a cushioned cargo-supporting structure, generally designated 22, according to one form of the invention. It will be understood that while the vehicle 20 is shown as a railroad freight car, the cushioned cargo-supporting structure 22 is equally applicable to other forms of cargo-carrying vehicles, such as highway trucks, trailers, semitrailers and cargo aircraft. Conventional details of the vehicle 10 have been omitted to simplify the showing of the invention, but the vehicle 10 is illustrated as having the usual floor 24, opposite end walls 26, side walls 28 equipped with said doors 30 within a side door opening 32, and a roof 34. The floor 24 rests upon and is supported by a conventional frame 36, to the opposite ends of which are connected the so-called trucks 38 upon which the traction wheels 40 and the usual springs (not shown) are mounted. The traction wheels 40, as usual, roll upon the usual railroad tracks 42. Conventional couplings 44 are connected to the opposite ends of the frame 36 in order to connect the car 20 to the remaining cars and locomotive of the train. Where the cushioned cargo-supporting structure 22 is applied to a highway trailer or semitrailer, a conventional fifth wheel replaces one of the coupling devices.

The cushioned cargo-supporting structure 22 includes two or more parallel stationary tracks or guideway members 46, shown as channel tracks and having attachment plates or lugs 48 (FIGURES 1 and 7) bolted or otherwise secured to the floor or bed 24 of the vehicle 20, in laterally-spaced parallel relationship and extending substantially the entire length of the vehicle 20. Where the nature of the load or cargo renders it advisable, a third or fourth intermediate track (not shown) similar to the tracks 46, is mounted between them. Where it is desired to roll the cargo into the vehicle 20 through the side door opening 32 onto the vehicle floor 24, the central section of each track 46 adjacent the side door opening 32 is optionally made removable to enable it to be detached during loading and replaced after loading has been completed. For purposes of simplification of showing, however, the stationary tracks 46 are shown as continuous from end to end of the vehicle 20.

Slidably mounted in each stationary track 46 is a movable track or cargo carrier member 50 shown for purposes of simplicity as sliding on plain bearing surfaces. The movable tracks 50 are T-shaped and are shorter than the stationary tracks 46 to permit reciprocation therealong. The tracks 50 have spaced holes 52 therein for clips (not shown), bolts or cap screws 54, passing through aligned holes 56 in stop blocks 58 engaging a cargo L, or through a cargo platform (not shown). The movable tracks 50 constitute the lowermost portion of a movable cargo carrier, generally designated 51 (FIGURE 2). The latter also includes transverse end walls 53 secured to and rising from the movable tracks 50 near their opposite ends, upper longitudinal members or upper tracks or rails 55 guided by guide roller devices 57 mounted on the side walls 28 above the doors 30. Diagonal braces 59 are secured to and extend obliquely between the lower and upper rails 50 and 55 and the end walls 53 to increase the strength and rigidity of the structure 51.

Welded or otherwise secured to the side of the movable tracks 50 (FIGURES 3 and 4) and projecting outwardly therefrom are longitudinally-spaced thrust plates or thrust arms or movable abutments 60 and 62 which travel back and forth with the movable rails 50 but which in the neutral or resting position of the invention lie between pairs of longitudinally-spaced stationary abutment plates or arms or stationary abutments 64 and 66. The thrust plates 60 and 62 and the abutment plates 64 and 66 have spherical concave seats 68 (FIGURE 4) for engagement by the correspondingly spherically-curved convex end surfaces 70 on the piston rod end 72 and cylinder head 74 of the piston rod 76 and cylinder 78 of a hydropneumatic reciprocatory cushioning motor, generally designated 80. The stationary track 46 is provided with an elongated horizontal side wall slot 82 through which the thrust plates 60 and 62 project into the path of the piston rod end 72 and cylinder head 74 for engagement therewith. This construction provides a self aligning or pivoting connection which minimizes any otherwise adverse effects of misalignment during assembly or operation.

The cylinder head 74 is connected to and closes one end of the cylinder 78 (FIGURE 5), whereas the piston rod end 72 is connected to and closes the forward end of the hollow piston rod 76 which in turn is connected to a hollow piston head 84 reciprocably mounted within the cylinder bore 86 of the cylinder 78. The latter has an open annular end wall 88 through which the hollow piston rod 76 passes and near it is provided with a vent port 90. The cylinder 78 is slidably mounted in the horizontal bore 92 of a guide block or bracket 94 (FIGURE 8) which is welded or otherwise secured to the adjacent side wall of the stationary channel track 46.

The hollow piston rod 76 contains a longitudinal bore 96 (FIGURE 5) in which is reciprocably mounted the floating piston or free piston or auxiliary piston head 98 which divides the piston rod bore 96 into a pneumatic chamber 100 filled with a suitable compressed gas, such as compressed nitrogen, and an intermediate or middle hydraulic chamber 102 filled temporarily and partially emptied during operation of a suitable hydraulic working liquid, such as oil. The end of the hydraulic cylinder 78 adjacent the cylinder head 74 contains a main hydraulic chamber 104 communicating with the intermediate chamber 102 through a counterbore 106 into which is threaded or otherwise secured the correspondingly-threaded flange 108 of a flow control valve, generally designated 110, of any suitable type responsive to the attainment of a predetermined pressure in the intermediate hydraulic chamber 102 to open and discharge hydraulic fluid therefrom into the main hydraulic chamber 104. Such a suitable flow control valve 110 is disclosed and claimed in combination with the cushioning motor 80 in my previously-mentioned co-pending application, Serial No. 72,476, filed November 29, 1960, for Constant Speed Hydro-Pneumatic Motor which on March 5, 1963, was issued as U.S. Patent No. 3,079,897, and is shown in detail in FIGURE 3 thereof. As shown in the above-identified application and patent issued thereon, the flow control valve 110 contains a spring-pressed tubular reciprocatory valve plunger (not shown) which opens and closes wall ports in the valve casing 112 between the flanges 108 and 114 thereof so as to provide regulated flow of hydraulic fluid at a constant rate during the closing stroke of the motor and free flow thereof during its opening stroke. The flange 108 has longitudinal ports (not shown) therethrough connecting the space between the flanges 108 and 114 with the main hydraulic chamber 104.

In the operation of the cushioned cargo-supporting structure 22 of the present invention, let it be assumed that a cargo article or load L has been carried through the door opening 32, as by a fork lift truck, deposited on the movable tracks 50 of the cargo carrier 51, and secured in position by the stop blocks 58. Only one such load article L is shown in FIGURES 1 and 2, in order to simplify the disclosure, but it will be understood that enough of such load articles L will be similarly mounted on the movable tracks 50 to the full capacity of the vehicle 20. Thus, the single load article L, for example, could represent a very heavy article of steel or the like which would constitute the entire load capacity of the car 20. The car or other vehicle 20 is then ready for travel, which for the purpose of the present example, will be assumed to be from left to right in the direction of travel indicated by the arrows near the upper right-hand corner of FIGURE 1.

During the travel of the vehicle 20, let it be assumed that the operator thereof has been required to apply the brakes thereof suddenly, with a consequent rapid deceleration of the vehicle 20 which in the absence of the cushioned cargo-supporting structure 22 might seriously damage the cargo load L because of the impact shock resulting from the jolt imparted thereto. While the vehicle 20 is rapidly decelerating, the cargo load article L, by reason of its acquired momentum or inertia, continues to travel in a forward direction from left to right, carrying with it the movable cargo carrier 51 from left to right in FIGURE 1. As a result of this action, the thrust plates 60 connected to the movable tracks 50 engage the piston rod ends 72 and move the hydropneumatic cushioning motors 80 bodily along the stationary tracks 46 through the bores 92 in the brackets 94 toward the forward or right-hand end of the bed or floor 24 of the vehicle 20 until the cylinder heads 74 encounter and are halted by the stationary abutment plates 66. The thrust plates 60, however, continue to move, thereby pushing the piston rods 76 and piston heads 84 further into their cylinders 78. As a consequence, the flow control valve 110 of each hydropneumatic cushioning motor 80 opens and permits hydraulic fluid to flow at a constant rate of speed through an orifice in the valve 110 from the main hydraulic chamber 104 into the intermediate hydraulic chamber 102 where it in turn acts against the free piston 98 and consequently forces it to move at a constant rate of speed toward the piston rod end 72, at the same time further compressing the gas in the pneumatic chamber 100.

The action just described provides a precisely-regulated protracted or retarded deceleration of the movable tracks 50 of the movable cargo carrier 51 and with them the load article L supported by them, relatively to the more rapidly decelerating relatively-stationary tracks 46 secured to the vehicle floor 24. This reduced deceleration prevents damage which might otherwise occur to the cargo article of load L if the latter were directly and fixedly secured to the vehicle bed or floor 24. If any misalignment of the components of the cushioning reciprocatory motor 80 occurs during operation, it is compensated for by the self-aligning rocking of the rounded cylinder head 74 and piston rod end 72 in their respective concave spherical seats 68.

The initial halting of the movable cargo carrier 51 in this manner does not necessarily absorb all of the energy resulting from the excessive deceleration of the vehicle 20 for the reason that the cargo articles L often consist of many such articles which are relatively thin and placed close together, such as, for example, automobile windshields, fenders, sheet metal body stampings and the like. It is ordinarily not practical or feasible to rigidly anchor all of these closely-spaced thin articles so that no relative motion whatever occurs between them and the movable cargo carrier 51. As a consequence, even though the cargo carrier 51 may have halted and with it the foremost cargo article L, the remaining cargo articles continue their motion by sliding along the movable cargo carrier 51 until they close up the gaps between them.

Each such contact of a sliding or otherwise relatively moving cargo article with the halted cargo article or articles in front of it causes the kinetic energy thus developed by the relatively-moving cargo article to be transmitted to the halted cargo article in front of it, which kinetic energy is in turn transmitted to the movable cargo carrier 51, the latter, as a result, is caused to resume its travel momentarily relatively to the vehicle 20 until it is again halted by the action of the hydropneumatic reciprocatory cushioning devices 80 which operate in the above-described manner to bring it again to a halt.

However, the previous motion of the free pistons 98 within their respective hollow piston rods 76 in response to the action of the hydraulic fluid ejected from the main hydraulic chamber 104 of the cylinder 78 through their respective valves 110 into the intermediate hydraulic chamber 102 thereof has stored up a tremendous amount of undischarged opposing kinetic energy in the form of further compressed gas within each pneumatic chamber 100. This kinetic energy is now instantly applied to again halt the movable cargo carrier 51 the instant it starts moving, without the necessity of its acquiring motion in order to develop such opposing kinetic energy, as is the case with hydraulic cushioning devices which are purely velocity-sensitive, the cushioning action of which ceases, without any stored up energy, the instant the movable cargo carrier halts for the first time and for each succeeding time. This previously stored up cushioning kinetic energy in the applicant's present invention instantly absorbs the kinetic energy to again halt the movable cargo carrier 51.

The above-described action occurs as each cargo article L slides or otherwise moves forward and halts against the already halted cargo article or stacked articles in front of it. For a large number of thin cargo articles L, even though separated by small intervals such as, for example, one quarter of an inch, the resulting travel of each succeeding sliding article L is increased by the closing up of the gap in front of it so that the rearmost cargo article can still travel a considerable distance equal to the sum of these intervals, with the consequent development of a considerable amount of kinetic energy which must be absorbed in order to prevent damage to the cargo articles. This in the present invention is accomplished in the manner described above, a manner and mode of operation which from FIGURE 5 and my above-identified Patent 3,079,897 of March 5, 1963 is seen to be inherent in the construction and operation of the present invention, as described above.

Thus, in hydraulic cushioning devices which are velocity-sensitive so that they depend for the development of cushioning kinetic energy upon the actual travel and motion of the cargo carrier, the cushioning kinetic energy decreases to zero upon each halting of the cargo carrier, and any energy remaining unabsorbed at the end of initial travel of the movable cargo carrier, such as by the sliding of the cargo itself relatively to the cargo carrier, is required to be absorbed by kinetic energy which has to be redeveloped by the resumption of travel and velocity of the movable cargo carrier, thereby requiring longer stroke and additional time in which to accomplish the necessary cushioning action.

The hydropneumatic free pistons 98 of the hydropneumatic cushioning arrangement of the present invention avoids these limitations of non-pneumatic hydraulic cushioning devices by further compressing the already highly precompressed gas in their respective pneumatic chambers 100, an action which, unlike the action of non-pneumatic hydraulic cushioning devices, does not cease to function by the drop of the hydraulic cushioning pressure to zero upon each termination of travel. Instead, it resumes operation and cushioning counteraction instantly at a higher but still safe pressure level each time the movable cargo carrier 51 tends to resume its travel as a result of the above-described sliding of its cargo articles L relatively to the movable cargo carrier 51. It may also be stated that the cargo articles L, even if packed in cushioning materials in cartons, will move as a result of their inertia or momentum within such cartons into compressing engagement with the packing material which in turn transmits this kinetic energy to the carton and the carton in turn transmits it to the movable cargo carrier even after the latter has initially been halted by the hydropneumatic cushioning motors 80, with the cushioning action occurring instantly as a result of the already highly compressed gas within the pneumatic chambers 100.

The chart in FIGURE 14 shows the results of one of a series of tests made in the presence of the applicant and his counsel on January 26, 1962 on a cushioned cargo-supporting structure constructed according to the present invention. These tests were performed under the applicant's direction on that date at the Midland Ross Building formerly occupied by the Midland Ross Company and having a railroad siding and trackage extending alongside as well as into the building. During these tests, the cushioned cargo-supporting structure of the present invention was mounted in a freight car of the type and in the manner shown diagrammatically in FIGURES 1 and 2 of this application, and accelerometers and other force measuring devices operatively connected to the movable cargo carrier 51 by the Law Engineering Company of Detroit, Michigan, which made and recorded the measurements of the accelerations and forces developed during tests.

In making these tests a diesel yard locomotive was backed into engagement with the freight car while the latter was standing motionless on the siding, causing the thus-moving freight car to travel freely along the track into collision with a string of twelve freight cars standing motionless with their brakes set, and the impact forces and accelerations and decelerations developed in the moving test car were recorded by the various instruments as graphs in rectangular coordinates. FIGURE 14 was reproduced from a photostatic copy of one such actual record. The horizontal or X-coordinate represents time intervals in tenths of seconds, whereas the vertical or Y-coordinate variously represents distance of cargo carrier travel, in inches pressure, in pounds per square inch and acceleration in gravitational units G, as indicated in the notations relating to the respective graphs in FIGURE 14. The short interval between the zero time line and the line immediately to the right of it represents the interval between the initial engagement and end of travel of the car coupler.

The lowermost graph (Length) shows travel of the cargo carrier 51 from the point of impact, its upward movement indicating distance upward; the second graph from the bottom (10 G) measured by a 10 G accelerometer indicates acceleration found on the cushioned cargo carrier and its load being protected; the third graph (50 G) indicates acceleration forces, measured by a 50 G accelerometer, found at the uncushioned roof of the railroad car; the fourth graph (500 G) indicates forces, measured by a 500 G accelerometer, as found at the uncushioned floor level of the railroad car; the fifth and final graph (Pressure) indicates pressures found in the main hydraulic chamber 104 of the hydropneumatic reciprocatory cushioning motor 80.

The pneumatic pressures in the pneumatic chamber 100 are a function of the hydraulic pressures in the main hydraulic chamber 104 and work in cooperation therewith, as indicated by the uppermost graph (Pressure). The travel of the cargo carrier 51 terminates at the vertical line at the rearward or left-hand end of the arrow marked "Return Travel of Load" at which point it will also be observed that the working energy as indicated by the Pressure graph remains at a high level, instantly ready to oppose and cushion any subsequently-developed forces, so that any energy remaining unabsorbed at the end of cargo carrier travel continues to be absorbed by the hydropneumatic free piston arrangement thereof, unlike nonpneumatic hydraulic cushioning devices which cease to function upon termination of travel. This is indicated in FIGURE 14 by the approximately high level continuation of the Pressure graph continuing right up to the very "end of cushion travel." It should be observed that the much greater lengths of the positions of the graphs to the right of the vertical line designated "Return Travel of Load" indicates that the time elapsing during the return travel of the cargo carrier 51 to its neutral or starting position is greatly protracted.

The full time of return travel of the cargo carrier 51 cannot be completely represented in FIGURE 14 due to the time scale employed therein, because the interval between each pair of vertical lines represents a travel of the cargo carrier 51 horizontally of 0.1 second, whereas the length of time required to complete the return stroke or recoil of the cargo carrier 51 during the above test was 8.0 seconds.

Thus, the cooperative effect and action of the applicant's combined use of hydraulics and pneumatics instead of solely hydraulic action of the nonpneumatic hydraulic cushioning devices produces a more efficient energy-absorption graph than is possible with the purely hydraulic prior systems, which produce merely and solely a velocity-sensitive action.

It will also be observed from the Length graph of FIGURE 14 that the distance traveled by the cargo carrier 51 in relation to the time of cushioning is almost a straight line function as indicated by the almost straight line slant of the travel distance curve. Consequently, this indicates a substantially constant rate of energy absorption, as further confirmed by the almost level condition of the Pressure graph during the same time interval.

Finally, it will be observed from the notations in the lower right-hand corner of FIGURE 14 that although the test car and cargo carrier 51 therein were traveling at a speed of 10.03 miles per hour at the point of impact with the stationary freight cars, and the test car experienced acceleration forces at the floor line of 32 G's, the acceleration forces on the cargo carrier 51 reached a maximum of only 3 G's or less than one-tenth as much.

When the deceleration of the cargo vehicle 20 has ceased, the pressure of the pneumatic fluid additionally impressed thereby in the pneumatic chamber 100 of the reciprocatory cushioning motor 80 by the movement of the free piston 98 within the piston rod bore 96, causes each hollow piston rod 76 to move away from its respective cylinder 78. Thereupon the movable tracks 50 are shifted to the left (FIGURES 1 and 2) toward their original positions relatively to the relatively stationary tracks 46 secured to the vehicle bed or floor 24, thus returning the cargo load L to its original position without damage.

While the foregoing operation has been described as applied to the deceleration of the vehicle, it will be understood that the cushioned cargo supporting structure also operates in a similar manner to protect the cargo or load L against damage due to rapid acceleration during either direction of travel or due to rapid deceleration during backing of the vehicle. The cushioned cargo supporting motors or cylinders 80 under such circumstances provide a controlled acceleration or deceleration, as the case may be. For example, as shown in FIGURE 4, the excessive acceleration of the vehicle 20 in a forward direction from left to right has caused the right-hand thrust plate 62 to move to the left between its associated abutment plates 66, pushing the cylinder 78 to the left along with it while the stationary abutments 64 attached to the stationary tracks 46 hold the piston rod ends 72 and hollow piston rod 76 stationary while the left-hand thrust plate 60 moves to the left from between the stationary abutment plates 64 (FIGURE 4).

The modified cargo vehicle, generally designated 20, shown in FIGURES 9 to 13 inclusive, containing modifications of the cushioned cargo-supporting structure 22 of the present invention, provides a plurality of tiers of such structures, generally designated 122, 124 and 126, arranged at different horizontal levels. The lowermost cargo supporting structure 122 is of substantially the same construction and operation as the cushioned cargo-supporting structure 22 described above in connection with FIGURES 1 to 8 inclusive. In FIGURES 9 to 13, however, the lowermost cushioned cargo-supporting structure 122 is additionally shown as having a platform or platforms 125 bolted or otherwise mounted upon the movable tracks 50, the platform or platforms 125 in turn carrying the load articles L secured thereto. The load L carried thereby is sufficiently low in height to permit one or more tiers of loads M and N to be placed above it within the vehicle 120, which has a floor 128, opposite side walls 130 and a roof 132. The vehicle 120 also has trucks 134 rotatably supporting wheels 136 which in turn roll along rails 138 on the road bed.

The cushioned cargo supporting structures 124 and 126 are of similar construction to the cushioned cargo supporting structure 122 except that their stationary channel tracks 146 are bolted or otherwise secured to the side walls 130 of the vehicle 120 (FIGURES 11, 12 and 13) and their movable tracks 150 are accordingly rotated 90 degrees so that their upper portions project horizontally. The movable tracks 150 of the cushioned cargo supporting structures 124 and 126 are shown as also provided with platform 144, these however, being bolted or otherwise secured to what would have been the side surfaces of the upper portions of the movable tracks 50 of FIGURES 1 to 8 inclusive but which now become the top surfaces.

Except for their altered positions by being rotated 90 degrees, the remaining components of the cushioned cargo supporting structures 124 and 126 are of substantially identical construction to the components of the cushioned cargo-supporting structure 22 of FIGURES 1 to 8 inclusive, these component parts being therefore designated with the same reference numerals, increased by 100, as the corresponding components of the structure 22. Thus, the thrust plates 160 and 162 (FIGURES 10 and 11) project upwardly from the movable tracks 150 through the slots 182 in the stationary tracks 146, which are bolted or otherwise secured to the vehicle side walls 130. The abutment plates 164 and 166, as a consequence, also project upwardly rather than horizontally from the stationary tracks 146 (FIGURES 10 and 12). The guide blocks or brackets 194 (FIGURES 10 and 13), being also rotated 90 degrees, are likewise bolted or otherwise secured to the vehicle side walls 130.

The operation of the lowermost cushioned cargo-supporting structure 122 is the same as that described above for the structure 22, and requires no duplication. The operation of the cushioned cargo-supporting structures 124 and 126 (FIGURES 9 to 13 inclusive) is also the same as that described above for the structure 122, notwithstanding the slightly different positions of the stationary and movable tracks 146 and 150 and their associated parts. Accordingly, no repetition of the description of the operation is considered to be necessary.

What I claim is:

A cushioned cargo-supporting structure adapted for installation upon a vehicle body, comprising a plurality of elongated guideway members disposed in substantially horizontal laterally-spaced parallel relationship and having guideway member abutments thereon, means on said guideway members adapted for attachment thereof to the vehicle body in a direction lengthwise of the vehicle body, a cargo carrier member slidably mounted in each guideway for travel therealong and having cargo carrier member abutments thereon, means on said cargo carrier members for securing cargo thereto, and a constant speed hydropneumatic fluid pressure motion-retarding reciprocatory motor disposed between each guideway member abutment and its respective cargo carrier member abutment, said motor having a cylinder element aligned with one of said abutments for engagement therewith and a piston element reciprocably mounted in said cylinder element and aligned with the other of said abutments for engagement therewith, said motor including flow control valve means responsive to the attainment of a predetermined pressure within said motor for controlledly releasing hydraulic pressure fluid at a substantially constant rate of flow from one of said elements into the other element in consequence of relative motion between said elements resulting from relative motion between their respective abutments, said motor piston element having a hollow piston rod and an auxiliary piston head mounted for reciprocation within said piston rod, and pneumatic pressure fluid being disposed on one side of said auxiliary piston head and hydraulic fluid on the other side thereof.

References Cited by the Examiner

UNITED STATES PATENTS

| | | | |
|---|---|---|---|
| 2,875,706 | 3/1959 | Pacetti | 105—374 |
| 3,003,436 | 10/1961 | Peterson | 105—454 |
| 3,079,897 | 3/1963 | Kirsch. | |

EUGENE G. BOTZ, *Primary Examiner.*

ARTHUR L. LA POINT, *Examiner.*

D. E. HOFFMAN, *Assistant Examiner.*